(12) United States Patent
Gill et al.

(10) Patent No.: US 7,370,404 B2
(45) Date of Patent: May 13, 2008

(54) METHOD FOR RESETTING PINNED LAYER MAGNETIZATION IN A MAGNETORESISTIVE SENSOR

(75) Inventors: Hardayal Singh Gill, Palo Alto, CA (US); Jinshan Li, San Jose, CA (US); Kenneth Donald Mackay, San Jose, CA (US); Kouichi Nishioka, Hiratsuka (JP); Andy Cuong Tran, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 452 days.

(21) Appl. No.: 10/857,168

(22) Filed: May 28, 2004

(65) Prior Publication Data

US 2005/0011066 A1  Jan. 20, 2005

Related U.S. Application Data

(63) Continuation-in-part of application No. 10/104,213, filed on Mar. 21, 2002, now Pat. No. 6,866,751.

(51) Int. Cl.
   *G11B 5/127* (2006.01)
(52) U.S. Cl. .............................. 29/603.08; 29/603.01; 29/603.07; 29/603.13; 29/603.14; 360/324.12
(58) Field of Classification Search ............. 29/603.08, 29/603.14, 603.01, 603.04, 603.07, 603.13, 29/603.06; 204/192.2, 192.15; 360/240, 360/313, 314, 315, 324.1, 324.12, 324.2
See application file for complete search history.

(56) References Cited

U.S. PATENT DOCUMENTS

| | | | | |
|---|---|---|---|---|
| 4,264,358 A | * | 4/1981 | Johnson et al. | 148/403 |
| 5,546,254 A | * | 8/1996 | Gill | 360/327.31 |
| 5,581,427 A | * | 12/1996 | Feng et al. | 360/327.1 |
| 5,583,725 A | | 12/1996 | Coffey et al. | 360/113 |
| 5,818,685 A | | 10/1998 | Thayamballi et al. | 360/113 |
| 5,880,912 A | | 3/1999 | Rottmayer | 360/113 |
| 5,974,657 A | * | 11/1999 | Fox et al. | 29/603.08 |
| 6,118,622 A | | 9/2000 | Gill | 360/113 |

(Continued)

OTHER PUBLICATIONS

Gill, "Canted Contiguous Hard Bias Stabilization for Very Thin Magnetoresistive/Giant Magneto-Resistance Sensor" IBM Technical Disclosure Bulletin Jun. 1996 p. 130-104.

*Primary Examiner*—A. Dexter Tugbang
*Assistant Examiner*—Tai Van Nguyen
(74) *Attorney, Agent, or Firm*—Zilka-Kotab, PC

(57) ABSTRACT

A spin valve sensor in a read head has a spacer layer which is located between a self-pinned AP pinned layer structure and a free layer structure. The free layer structure is longitudinally stabilized by first and second hard bias layers which abut first and second side surfaces of the spin valve sensor. The AP pinned layer structure has an antiparallel coupling layer (APC) which is located between first and second AP pinned layers (AP1) and (AP2). The invention employs a resetting process for setting of the magnetic moments of the AP pinned layers by applying a field at an acute angle to the head surface in a plane parallel to the major planes of the layers of the sensor. The resetting process sets a proper polarity of each AP pinned layer, which polarity conforms to processing circuitry employed with the spin valve sensor.

13 Claims, 13 Drawing Sheets

U.S. PATENT DOCUMENTS

| | | | |
|---|---|---|---|
| 6,127,053 A | 10/2000 | Lin et al. | 428/692 |
| 6,219,211 B1 | 4/2001 | Gill | 360/324.11 |
| 6,249,406 B1 * | 6/2001 | Gill et al. | 360/324.11 |
| 6,262,869 B1 * | 7/2001 | Lin et al. | 360/324.11 |
| 6,333,842 B1 * | 12/2001 | Nobuyuki et al. | 360/324.2 |
| 6,375,761 B1 * | 4/2002 | Gambino et al. | 148/301 |
| 6,522,134 B1 | 2/2003 | Gill | 324/210 |
| 2003/0179517 A1 | 9/2003 | Horng et al. | 360/324.12 |
| 2003/0184918 A1 | 10/2003 | Lin et al. | 360/314 |
| 2003/0184919 A1 | 10/2003 | Lin et al. | 360/314 |
| 2003/0231098 A1 | 12/2003 | Wan | 338/32 |

* cited by examiner

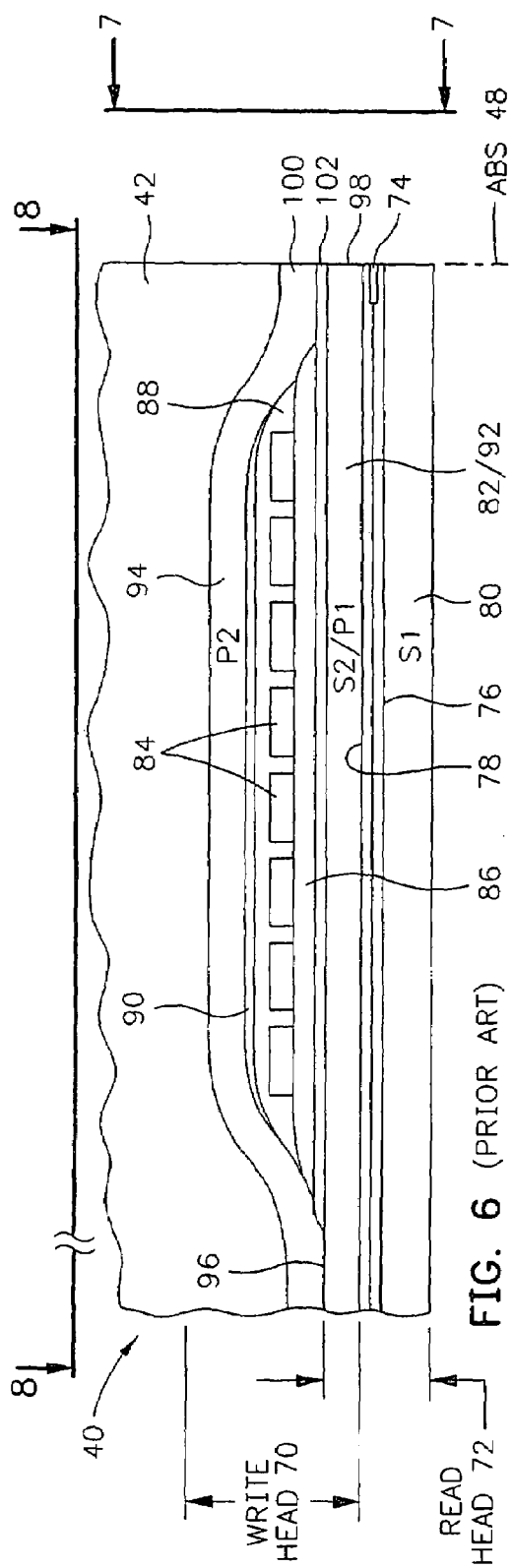
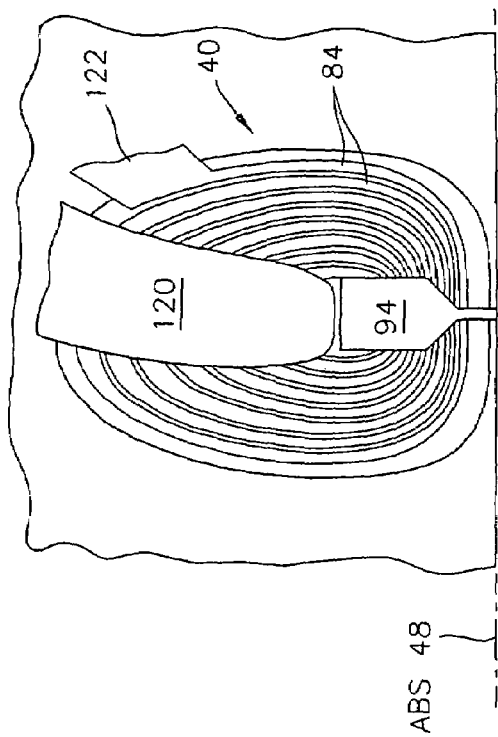
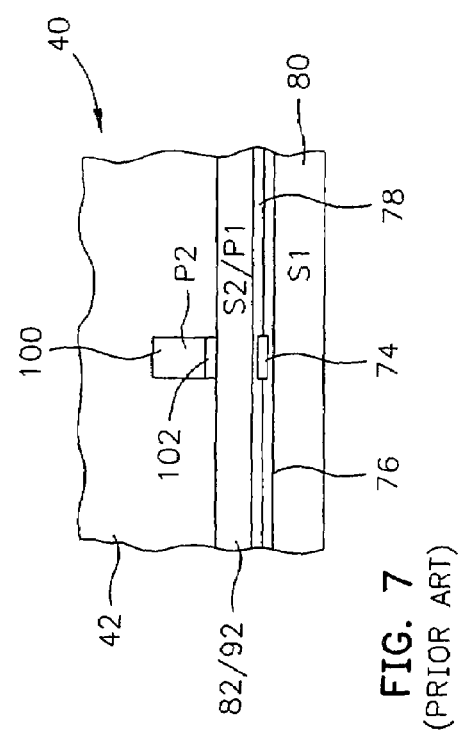
FIG. 6 (PRIOR ART)
FIG. 7 (PRIOR ART)
FIG. 8 (PRIOR ART)

(ABS)

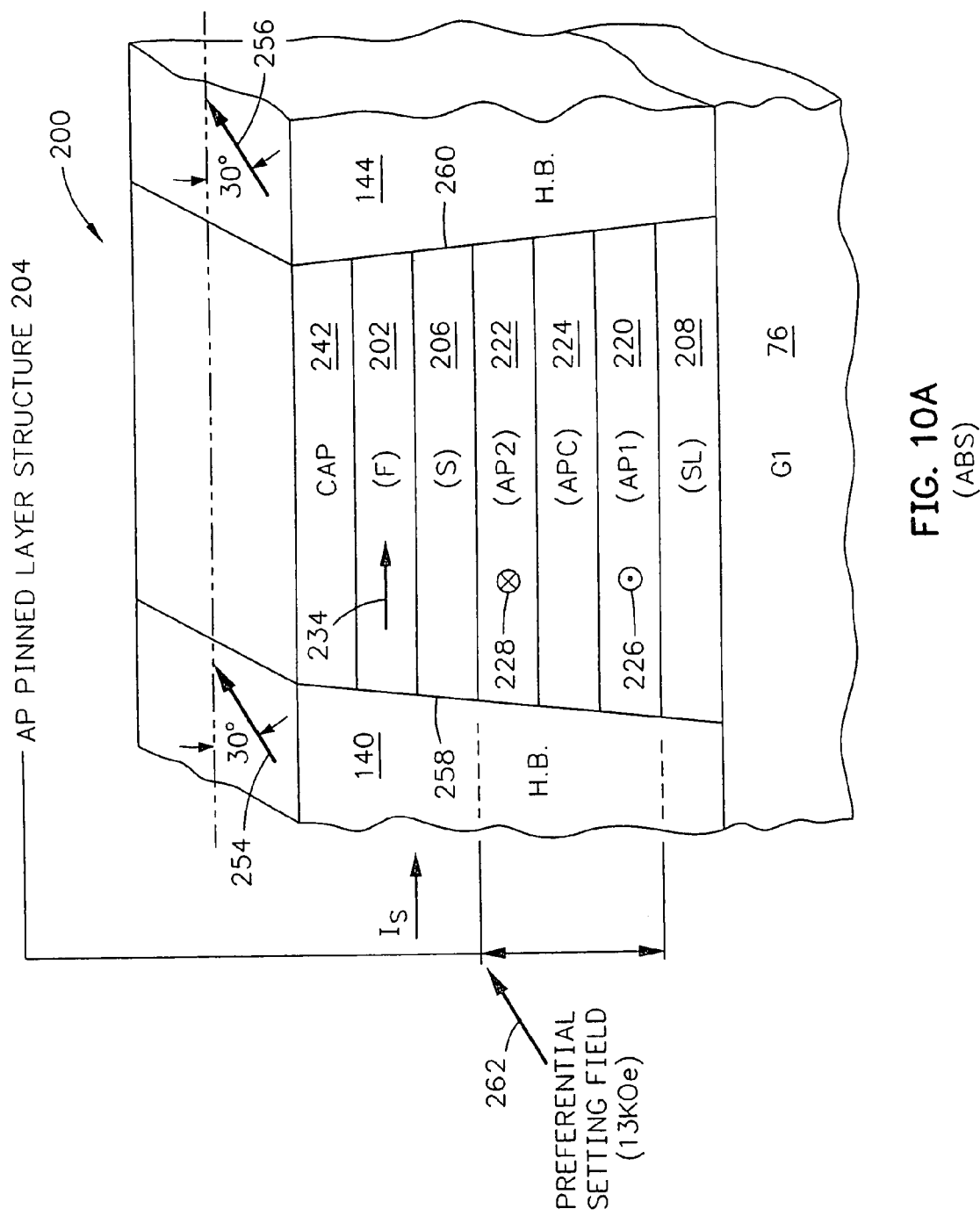
FIG. 10A (ABS)

(ABS)

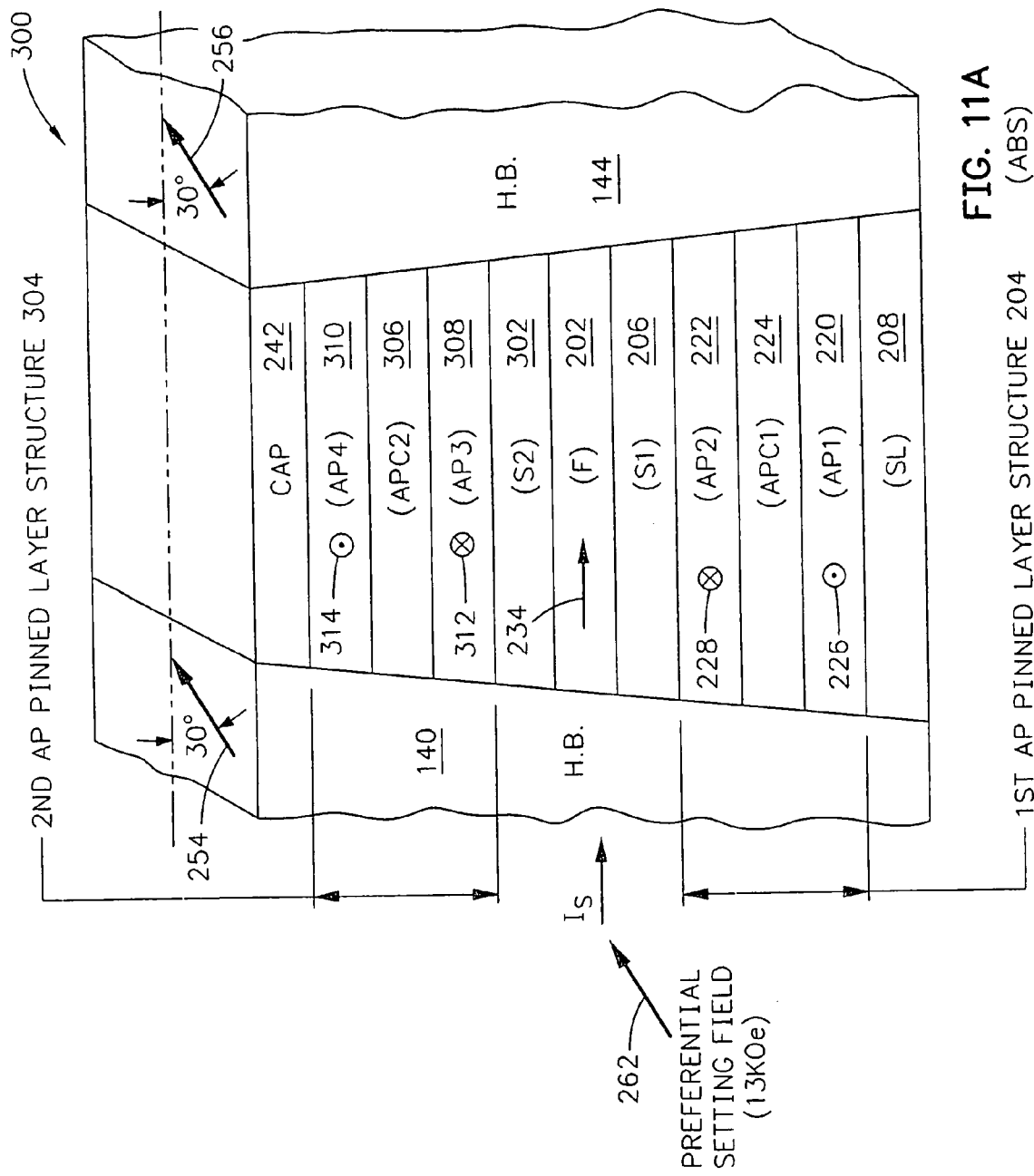
FIG. 11A (ABS)

METHOD FOR RESETTING PINNED LAYER MAGNETIZATION IN A MAGNETORESISTIVE SENSOR

CROSS REFERENCE TO RELATED APPLICATION

This is a Continuation-in-part application of prior application Ser. No. 10/104,213 filed on Mar. 21, 2002, now U.S. Pat. No. 6,866,751 designated the United States, the disclosure of which is incorporated herein by reference.

BACKGROUND OF THE INVENTION

1. Field of the Invention

The present invention relates to a method of resetting self-pinned antiparallel (AP) pinned layers that have experienced amplitude flipping during manufacturing processes such as lapping. The resetting is accomplished by applying a canted magnetic field and, more particularly, resetting the orientation (polarity) of magnetic moments of such layers by canting a high magnetic field at an acute angle to the air bearing surface (ABS) of a read head in a plane parallel to the major planes of the layers of the read head.

2. Description of the Related Art

The heart of a computer is a magnetic disk drive which includes a rotating magnetic disk, a slider that has write and read heads, a suspension arm above the rotating disk and an actuator arm. The suspension arm biases the slider into contact with the surface of the disk or parks the slider on a ramp when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the actuator arm swings the suspension arm to place the write and read heads over selected circular tracks on the rotating disk where field signals are written and read by the write and read heads. The write and read heads are connected to processing circuitry that operates according to a computer program to implement the writing and reading functions.

An exemplary high performance read head employs a spin valve sensor for sensing the magnetic field signals from the rotating magnetic disk. The sensor includes a nonmagnetic electrically conductive first spacer layer sandwiched between a ferromagnetic pinned layer structure and a ferromagnetic free layer structure. An antiferromagnetic pinning layer typically interfaces the pinned layer structure for pinning a magnetic moment of the pinned layer structure 90 degrees to the air bearing surface (ABS) wherein the ABS is an exposed surface of the sensor that faces the magnetic disk. First and second leads are connected to the spin valve sensor for conducting a sense current therethrough. A magnetic moment of the free layer structure is free to rotate upwardly and downwardly with respect to the ABS from a quiescent or bias point position in response to positive and negative magnetic field signals from the rotating magnetic disk. The quiescent position, which is preferably parallel to the ABS, is the position of the magnetic moment of the free layer structure with the sense current conducted through the sensor in the absence of field signals.

The thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering change the resistance of the spin valve sensor as a function of $\cos \theta$, where $\theta$ is the angle between the magnetic moments of the pinned and free layer structures. The sensitivity of the sensor is quantified as magnetoresistive coefficient dr/R where dr is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

In addition to the spin valve sensor the read head includes nonconductive nonmagnetic first and second read gap layers and ferromagnetic first and second shield layers. The spin valve sensor is located between the first and second read gap layers and the first and second read gap layers are located between the first and second shield layers. In the construction of the read head the first shield layer is formed first followed by formation of the first read gap layer, the spin valve sensor, the second read gap layer and the second shield layer. Spin valve sensors are classified as a top spin valve sensor or a bottom spin valve sensor depending upon whether the pinned layer is located near the bottom of the sensor close to the first read gap layer or near the top of the sensor close to the second read gap layer. Spin valve sensors are further classified as simple pinned or antiparallel (AP) pinned depending upon whether the pinned layer structure is one or more ferromagnetic layers with a unidirectional magnetic moment or a pair of ferromagnetic AP layers that are separated by a coupling layer with magnetic moments of the ferromagnetic AP layers being antiparallel to one another. Spin valve sensors are still further classified as single or dual wherein a single spin valve sensor employs only one pinned layer and a dual spin valve sensor employs two pinned layers with the free layer structure located therebetween.

A magnetic moment of the aforementioned pinned layer structure is typically pinned 90° to the ABS by the aforementioned antiferromagnetic (AFM) pinning layer. After deposition of the sensor, the sensor is subjected to a temperature at or near a blocking temperature of the material of the pinning layer in the presence of a field which is oriented perpendicular to the ABS for the purpose of resetting the orientation of the magnetic spins of the pinning layer. The elevated temperature frees the magnetic spins of the pinning layer so that they align perpendicular to the ABS. This also aligns the magnetic moment of the pinned layer structure perpendicular to the ABS. When the read head is cooled to room temperature the magnetic spins of the pinning layer are fixed in the direction perpendicular to the ABS which pins the magnetic moment of the pinned layer structure perpendicular to the ABS. After resetting the pinning layer it is important that subsequent elevated temperatures and extraneous magnetic fields not disturb the setting of the pinning layer.

It is also desirable that the pinning layer be as thin as possible since it is located within the track width of the sensor and its thickness adds to an overall gap length between the first and second shield layers. It should be understood that the thinner the gap length the higher the linear read bit density of the read head. This means that more bits can be read per inch along the track of a rotating magnetic disk which, in turn, enables an increase in the storage capacity of the magnetic disk drive.

A scheme for minimizing the aforementioned gap between the first and second shield layers is to provide a self-pinned AP pinned layer structure. The self-pinned AP pinned layer structure eliminates the need for the aforementioned pinning layer which permits the read gap to be reduced by 120 Å when the pinning layer is platinum manganese (PtMn). In the self-pinned AP pinned layer structure each AP pinned layer has an intrinsic uniaxial anisotropy field and a magnetostriction uniaxial anisotropy field. The intrinisic uniaxial anisotropy field is due to the intrinsic magnetization of the layer and the magnetostriction uniaxial anisotropy field is a product of the magnetostriction of the layer and stress within the layer. A positive magnetostriction of the layer and compressive stress therein results in a magnetostriction uniaxial anisotropy field that can support an intrinsic uniaxial anisotropy field. The orientations of the magnetic moments of the AP pinned layers are set by an external field. This is accomplished without the aforementioned elevated temperature which is required to free the magnetic spins of the pinning layer. It should be noted that if the self-pinning of the AP pinned layer structure is not sufficient, unwanted extraneous fields can disturb the orientations of the magnetic moments of the AP pinned layers or, in a worst situation, could reverse their directions. Accordingly, there is a strong-felt need to maximize the uniaxial magnetostriction anisotropy field while maintaining a high magnetoresistive coefficient dr/R of the spin valve sensor.

It is also important that the free layer be longitudinally biased parallel to the ABS and parallel to the major planes of the thin film layers of the sensor in order to magnetically stabilize the free layer. This is typically accomplished by first and second hard bias magnetic layers which abut first and second side surfaces of the spin valve sensor. The orientation of the magnetic moments of the first and second hard bias layers is parallel to the ABS and parallel to the major planes of the layers, which orientation is perpendicular to the orientation of the magnetic moments of the AP pinned layers.

Another problem that has been experienced with regard to pinned layer polarity flipping is that even when sensors are constructed with the proper polarity at wafer level, after the wafers have been sliced into rows and the ABS has been lapped, one or more of the sensors on the row exhibit incorrect polarity. Therefore, even with exemplary polarity setting during sensor fabrication, sensor polarity can be improper after further manufacturing processes such as lapping. This problem can be experienced with either self pinned sensors (ie. no AFM pinning) or in standard AFM pinned sensors.

SUMMARY OF THE INVENTION

The present invention provides a method for resetting the polarity of magnetoresistive sensor in which polarity of pinned layer mangnetization has flipped to an incorrect polarity. The invention involves placing the sensor in a high strength magnetic field that is canted with respect to the ABS.

The magnetic field used to reset the sensor can be parallel with the layers of the sensor and can be at an angle to 35 to 55 degrees or about 45 degrees with respect to the ABS of the sensor. The magnetic field can have a strength of 40 to 60 KOe or about 50 KOe. The resetting can be performed at room termperature and can be performed at row level or after the row has been sliced into individual sliders.

It has been found that during lapping of a row of sliders, mechanical stresses in the sensors cause stress induced anisotropy in the sensor that overcomes the exchange pinning in pinned sensor causing them to flip polarity. In self pinned sensors, the mechanical stress can cause the magnetostriction induced pinning to be momentarily lost which also leads to polarity flipping. It has also been found that this flipping is not the result of permanent damage and that if reset, the sensors exhibit acceptable performance and reliability. The resetting procedure of the present invention has resulted in slider yield improvement of 5 to 10 percent.

An aspect of the present invention is to ensure that sensors are produced with pinned layers having a proper polarity. A sensor may be designed with an antiparallel coupled (AP coupled) pinned layer, wherein first and second ferromagnetic layers are separated by an antiparallel coupling layer. The magnetizations of the first and second magnetic layers are pinned in opposite directions. It is important that the AP pinned layer that interfaces the free layer be oriented in the proper direction perpendicular to the ABS, which is referred to hereinafter as the proper polarity. The proper polarity is determined in conjunction with the design of the processing circuitry in FIG. 3 so that when the magnetic moment of the free layer is rotated upwardly or downwardly by field signals from the rotating magnetic disk the resistance changes in the read circuit conform to the design of the processing circuitry. As an example, if the magnetic moment of the AP pinned layer next to the free layer is oriented into the head when it should be oriented out of the head, the resistance changes in the read circuit are opposite to what they should be. Setting the proper polarity of the AP pinned layer next to the free layer is troublesome when present prior art techniques are employed. In numerous experiments, wherein the AP pinned layer next to the free layer had a magnetic thickness that was greater than the magnetic thickness of the AP pinned layer remote from the free layer, a strong magnetic field was applied perpendicular to the ABS in the desired direction to set the proper polarity of the AP pinned layer next to the free layer. The result was that in 30% of the tests the magnetic moment of the AP pinned layer next to the free layer was oriented antiparallel to the desired polarity. In these tests the applied field was gradually increased and then gradually decreased to zero.

We found that we can achieve the desired polarity for the AP pinned layer next to the spacer layer by applying a canted magnetic field, which canted magnetic field is at an acute angle to the ABS and is oriented within a plane parallel to the major plane surfaces of the AP pinned layers. This result is referred to hereinafter as a preferential setting of the polarities of the magnetic moments of the AP pinned layers and has resulted in 100% of the AP pinned layers of the magnetic heads tested having the proper polarity. In the tests the AP pinned layer next to the spacer layer had a magnetic thickness that was greater than the magnetic thickness of the AP pinned layer which is remote from the spacer layer. The canted magnetic field applies a torque to the magnetic moments of the AP pinned layers and when it has a component in a desired direction perpendicular to the ABS the magnetic moment of the AP pinned layer next to the spacer layer will assume the direction of that component. Accordingly, when the component of the canted field is into the sensor the magnetic moment of the AP pinned layer next to the spacer layer will be oriented into the sensor and perpendicular to the ABS whereas if the component is out of the sensor the magnetic moment of the AP pinned layer next to the spacer layer will be oriented out of the sensor and perpendicular to the ABS. The magnetic moment of the AP pinned layer remote from the spacer layer will be antiparallel to the magnetic moment of the AP pinned layer next to the spacer layer since the AP pinned layer remote from the spacer layer has a magnetic thickness which is less than the magnetic moment of the AP pinned layer next to the spacer layer. In the experiments, the canted field was 13 kOe.

After applying the canted field it should be noted that the magnetic moments of the hard bias layers are oriented in the same direction as the canted field. This means that the magnetic moments of the first and second hard bias layers are at an angle to the ABS which means that only the component of the magnetic moment of each hard bias layer which is parallel to the ABS is useful for stabilizing the free layer. Another aspect of this invention is to apply a longitudinal field to the sensor after the preferential setting which will align the magnetic moment of each of the hard bias layers parallel to the ABS. In this manner the thickness of each hard bias layers can be reduced since the entire magnetic moment of each hard bias layer is longitudinally stabilizing the free layer.

Another aspect of the invention is to set the easy axes of the magnetic moments of the AP pinned layers perpendicular to the ABS before the preferential setting. This is accomplished at the wafer level where rows and columns of magnetic head assemblies are located on a wafer. In a preferred embodiment, the first and second AP pinned layers are sputter deposited in a field which is oriented perpendicular to the air bearing surfaces of the magnetic head assemblies which results in the desired setting of the easy axes. After finishing the magnetic head assemblies at the wafer level, the magnetic head assemblies are diced into rows of magnetic head assemblies. The preferential setting of the polarities of the magnetic moments of the AP pinned layers and the longitudinal setting of the magnetic moments of the hard bias layers are preferably accomplished at the row level.

The present invention preferably employs cobalt iron (CoFe) for each of the first and second AP pinned layers in a self-pinned AP pinned layer structure, however, the iron (Fe) content in the cobalt iron (CoFe) in the first and second AP pinned layers is different for improving the magnetostriction uniaxial anisotropy field while maintaining a high magnetoresistive coefficient dr/R. More specifically, the iron (Fe) content in the cobalt iron (CoFe) of one of the first and second AP pinned layers is greater than the iron (Fe) content in the cobalt iron (CoFe) in the other of the first and second AP pinned layers. In one embodiment of the invention the iron (Fe) content in the cobalt iron (CoFe) in the first AP pinned layer, which does not interface the spacer layer, is greater than the iron (Fe) content in the cobalt iron (CoFe) in the second AP pinned layer which interfaces the spacer layer. Experiments, which are explained in the aforementioned co-pending application, show that when the content of the first AP pinned layer comprises $Co_{60}Fe_{40}$ and the content of the second AP pinned layer comprises $Co_{90}Fe_{10}$ the amplitude output and the magnetostriction uniaxial anisotropy field are improved while maintaining a high magnetoresistive coefficient dr/R.

An object of the present invention is to provide a method of preferentially setting the polarities of the magnetic moments of first and second AP pinned layers in an AP pinned layer structure of a read sensor.

Other objects and attendant advantages of the invention will be appreciated upon reading the following description taken together with the accompanying drawings.

BRIEF DESCRIPTION OF THE DRAWINGS

FIG. 6 is a partial view of the slider and a merged magnetic head as seen in plane 6-6 of FIG. 2;

FIG. 7 is a partial ABS view of the slider taken along plane 7-7 of FIG. 6 to show the read and write elements of the merged magnetic head;

FIG. 8 is a view taken along plane 8-8 of FIG. 6 with all material above the coil layer and leads removed;

FIG. 10A is an ABS view of one embodiment of the present spin valve sensor being preferentially set;

FIG. 11A is an ABS view of another embodiment of the present spin valve sensor being preferentially set;

DESCRIPTION OF THE PREFERRED EMBODIMENTS

Magnetic Disk Drive

Figure 1:
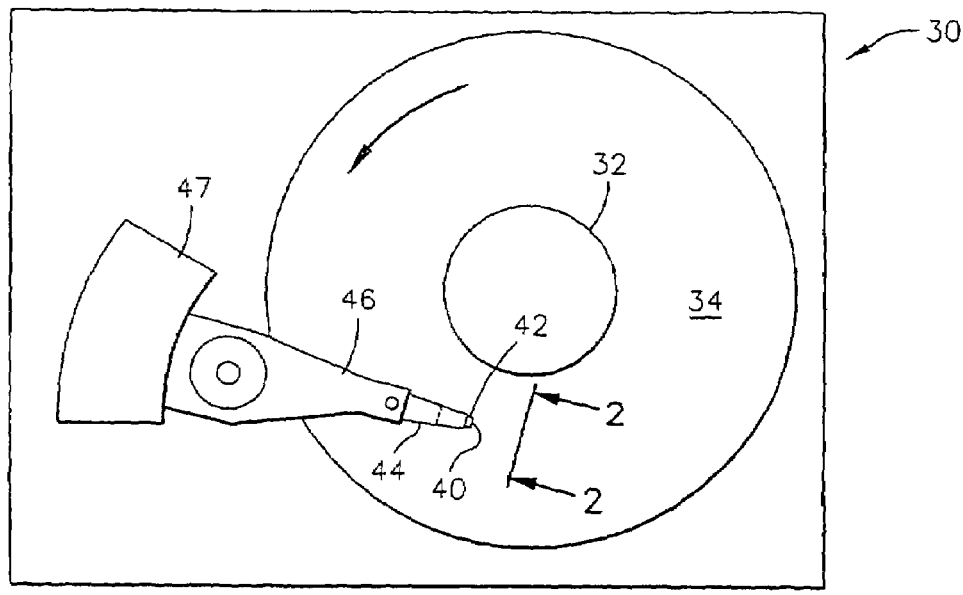
FIG. 1 is a plan view of an exemplary prior art magnetic disk drive.
Figure 2:
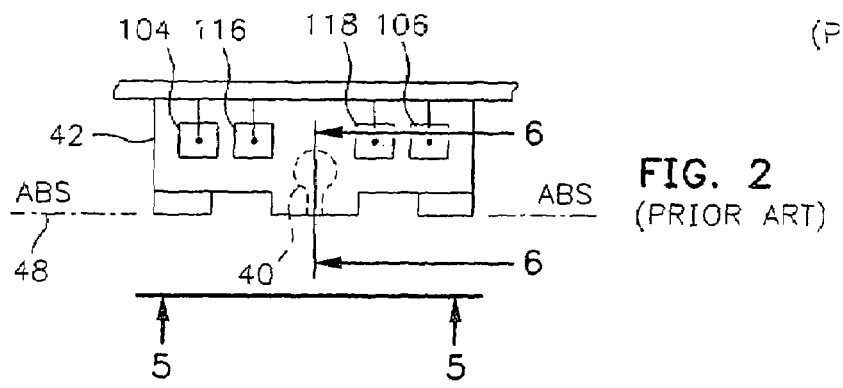
FIG. 2 is an end view of a slider with a magnetic head of the disk drive as seen in plane 2-2 of FIG. 1.
Figure 3:
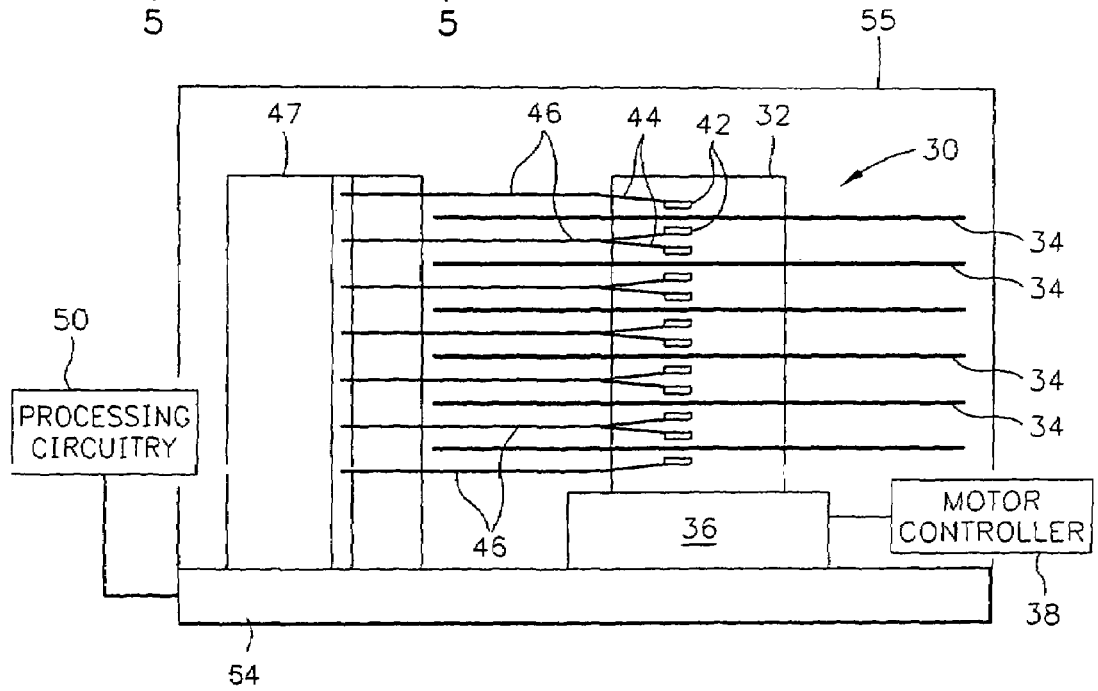
FIG. 3 is an elevation view of the magnetic disk drive wherein multiple disks and magnetic heads are employed.

Referring now to the drawings wherein like reference numerals designate like or similar parts throughout the several views, FIGS. 1-3 illustrate a magnetic disk drive 30.

Figure 4:
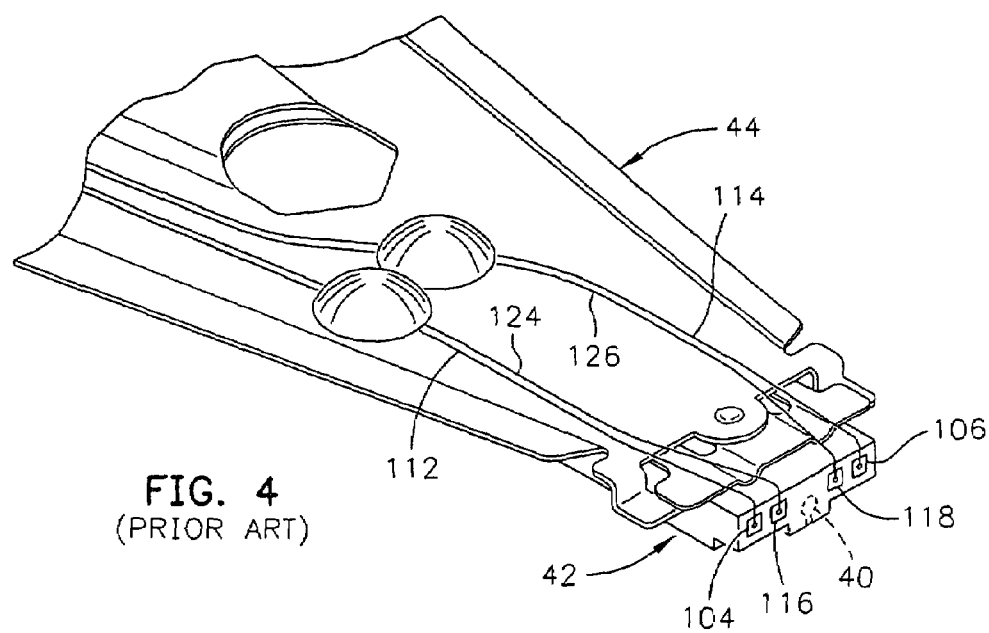
FIG. 4 is an isometric illustration of an exemplary prior art suspension system for supporting the slider and magnetic head.

The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.01 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
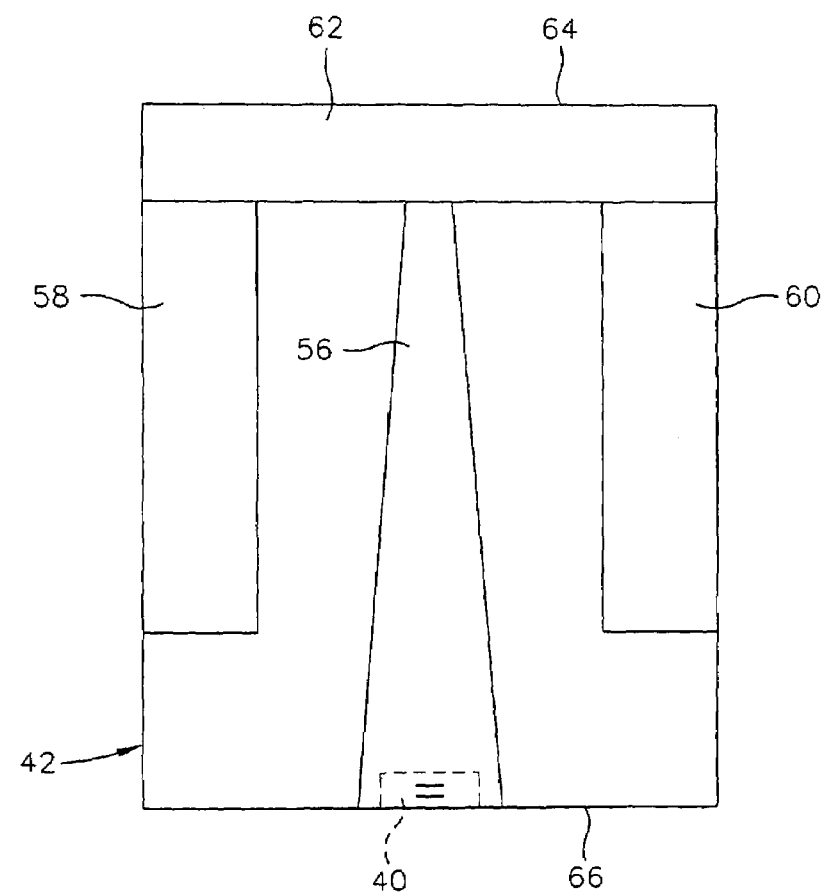
FIG. 5 is an ABS view of the magnetic head taken along plane 5-5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of a merged magnetic head 40, which includes a write head portion 70 and a read head portion 72, the read head portion employing a spin valve sensor 74 of the present invention. FIG. 7 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. When a sense current $I_S$ is conducted through the sensor the resistance changes cause potential changes which are processed as readback signals by the processing circuitry 50 shown in FIG. 3.

The write head portion 70 of the magnetic head 40 includes a coil layer 84 which is sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer this head is known as a merged head. In a piggyback head (not shown) the layers 82 and 92 are separate layers and are separated by an insulation layer. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
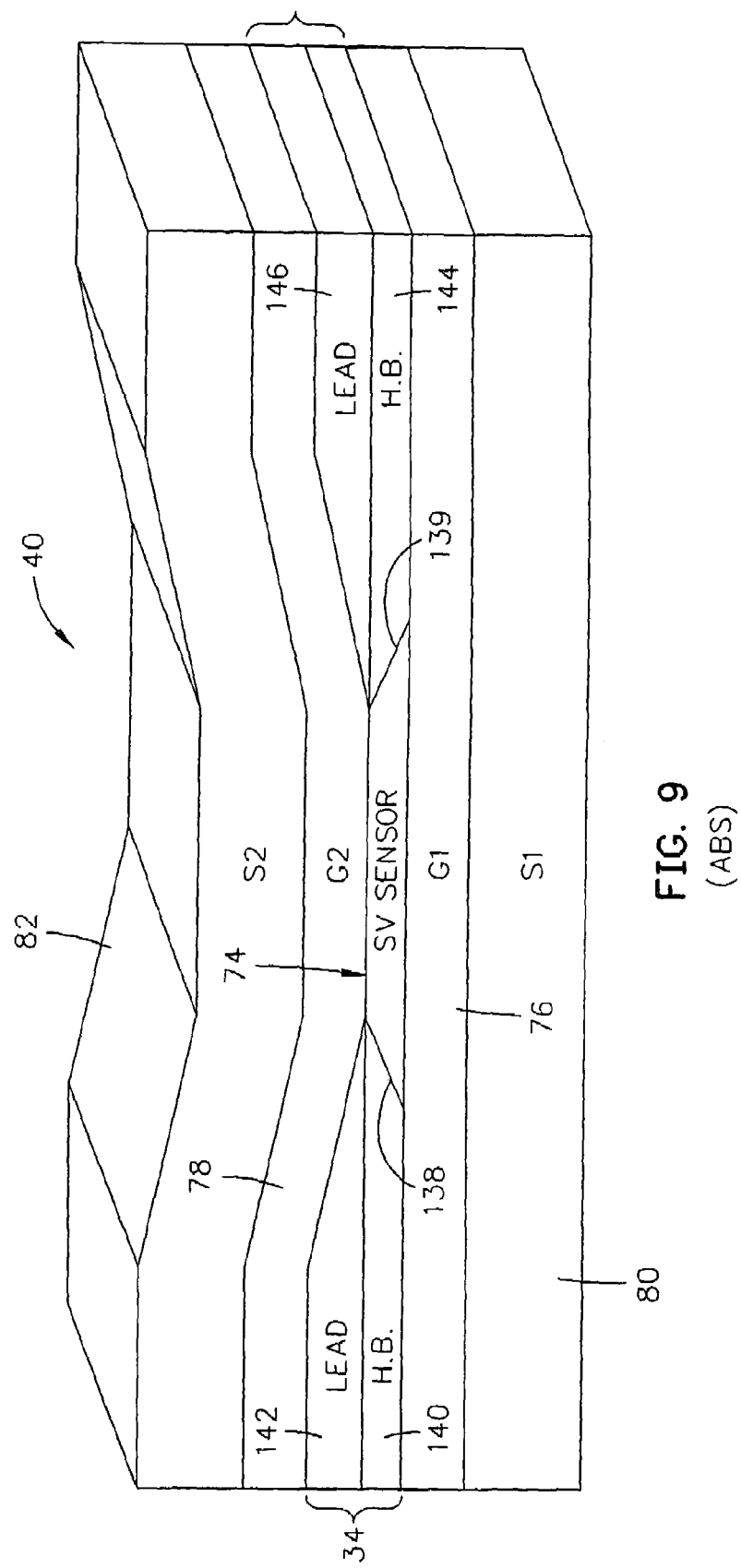
FIG. 9 is an enlarged isometric ABS illustration of the read head with a spin valve sensor.

FIG. 9 is an isometric ABS illustration of the read head 40 shown in FIG. 7. The read head 40 includes the spin valve sensor 74. First and second hard bias and lead layers 134 and 136 are connected to first and second side edges 138 and 139 of the spin valve sensor. This connection is known in the art as a contiguous junction and is fully described in commonly assigned U.S. Pat. No. 5,018,037. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 74 for stabilizing the magnetic domains therein. The spin valve sensor 74 and the first and second hard bias and lead layers 134 and 136 are located between the nonmagnetic electrically insulative first and second read gap layers 76 and 78 and the first and second read gap layers 76 and 78 are, in turn, located between the ferromagnetic first and second shield layers 80 and 82.

The Invention

One embodiment of the present spin valve sensor 200 is illustrated in FIG. 10A wherein the spin valve sensor is located between the first and second read gap layers 76 and 78 with only the gap layer 76 being shown in FIG. 10. The spin valve sensor 200 includes a free layer structure 202 and an antiparallel (AP) pinned layer structure 204. A nonmagnetic electrically nonconductive spacer layer (S) 206 is located between the free layer structure 202 and the AP pinned layer structure 204. Because the free layer structure 202 is located between the AP pinned layer structure 204 and the second read gap layer 78 or the first pole piece layer 92 the spin valve sensor 200 is a bottom spin valve sensor. A seed layer structure 208 may be located between the first read gap layer 76 and the AP pinned layer structure 204.

It should be noted that the spin valve sensor 200 does not include the typical antiferromagnetic (AFM) pinning layer for pinning magnetic moments of the AP pinned layer structure 204. An aspect of the invention is to provide an AP pinned layer structure 204 which is self-pinning. The AP pinned layer structure 204 includes ferromagnetic first and second AP pinned layers (AP1) and (AP2) 220 and 222. A nonmagnetic electrically conductive antiparallel coupling (APC) layer 224 is located between and interfaces the first and second AP pinned layers 220 and 222. The first AP pinned layer 220 has a magnetic moment 226 which is oriented perpendicular to the ABS in a direction, either away from the ABS or toward the ABS, as shown in FIG. 10A, and the second AP pinned layer has a magnetic moment 228 which is oriented antiparallel to the magnetic moment 226 by a strong antiparallel coupling between the first and second AP layers 220 and 222 is cobalt iron (CoFe).

In a preferred embodiment, one of the AP pinned layers is thicker than the other, such as the first AP pinned layer 220 may be 13 Å and the second AP pinned layer 222 may be 20 Å. The direction of the magnetic moment 228, either into or out of the sensor, is determined by the direction in which the magnetic moment 228 is set by an external magnetic field which is described in detail hereinbelow. When the AP pinned layers 220 and 222 are formed by sputter deposition they are deposited in the presence of a field which is oriented perpendicular to the ABS. In this manner, the easy axes of the first and second AP pinned layers will be likewise oriented perpendicular to the ABS.

The free layer structure has a magnetic moment 234 which is oriented parallel to the ABS and parallel to the major thin film planes of the layers. A sense current $I_S$ is conducted through the spin valve sensor from right to left or from left to right, as shown in FIG. 10A. When a field signal from the rotating magnetic disk rotates the magnetic moment 234 into the sensor the magnetic moments 234 and 228 become more parallel which decreases the resistance of the sensor to the sense current $I_S$ and when a field signal rotates the magnetic moment 234 out of the sensor the magnetic moments 234 and 228 become more antiparallel which increases the resistance of the sensor to the sense current $I_S$. These resistance changes change potentials within the processing circuitry 50 in FIG. 3 which are processed as playback signals. A cap layer 242 is located on the free layer structure 202 for protecting it from subsequent processing steps.

As can be seen from FIG. 10A the hard bias layers (HB) 140 and 144 have magnetic moments 254 and 256 respectively which are at an acute angle to the ABS and parallel to the major planes of the layers of the sensor, which acute angle will be described in more detail hereinbelow. The hard bias layers 140 and 144 abut first and second side surfaces 258 and 260 of the spin valve sensor for longitudinally biasing the free layer structure 202 so that the free layer structure is magnetically stabilized in a single magnetic domain state.

In a preferred embodiment the second AP pinned layer 222 has a magnetic thickness which is greater than the first AP pinned layer 220. The thicker cobalt or cobalt iron second AP pinned layer next to the spacer layer has been found to promote the magnetoresistive coefficient dr/R of the sensor. Assuming that the magnetic moment 228 of the second AP pinned layer has a proper polarity into the sensor, the proper polarity is accomplished by applying a magnetic field 262 at an acute angle, such as 30°, to the ABS and parallel to the major planes of the layers of the sensor so that a torque is applied to the magnetic moments 226 and 228 resulting in the magnetic moment 228 being oriented perpendicular to the ABS and into the sensor and the magnetic moment 226 being antiparallel thereto. In tests conducted, the magnetic field 262 was gradually increased from 0 up to 13 kOe and then gradually decreased from 13 kOe back to 0. With the present invention the polarities of the AP pinned layers of the magnetic heads tested had the proper polarities whereas when the magnetic field was oriented perpendicular to the ABS, 30% of the AP pinned layers of the magnetic head assemblies tested had the wrong polarity. If a proper polarity of the magnetic moment 228 is out of the sensor instead of into the sensor the magnetic moment 262 would directed antiparallel to that shown in FIG. 10A. Since a proper polarity is implemented with the present invention, the application of the canted field 262 is referred to as a preferential setting of the polarities of the magnetic moments of the AP pinned layers. It should be understood that the magnetic field 262 may be more or less than 13 kOe and the acute angle to the ABS may be more or less than 30°, such as between 15° and 45°.

Figure 10B:
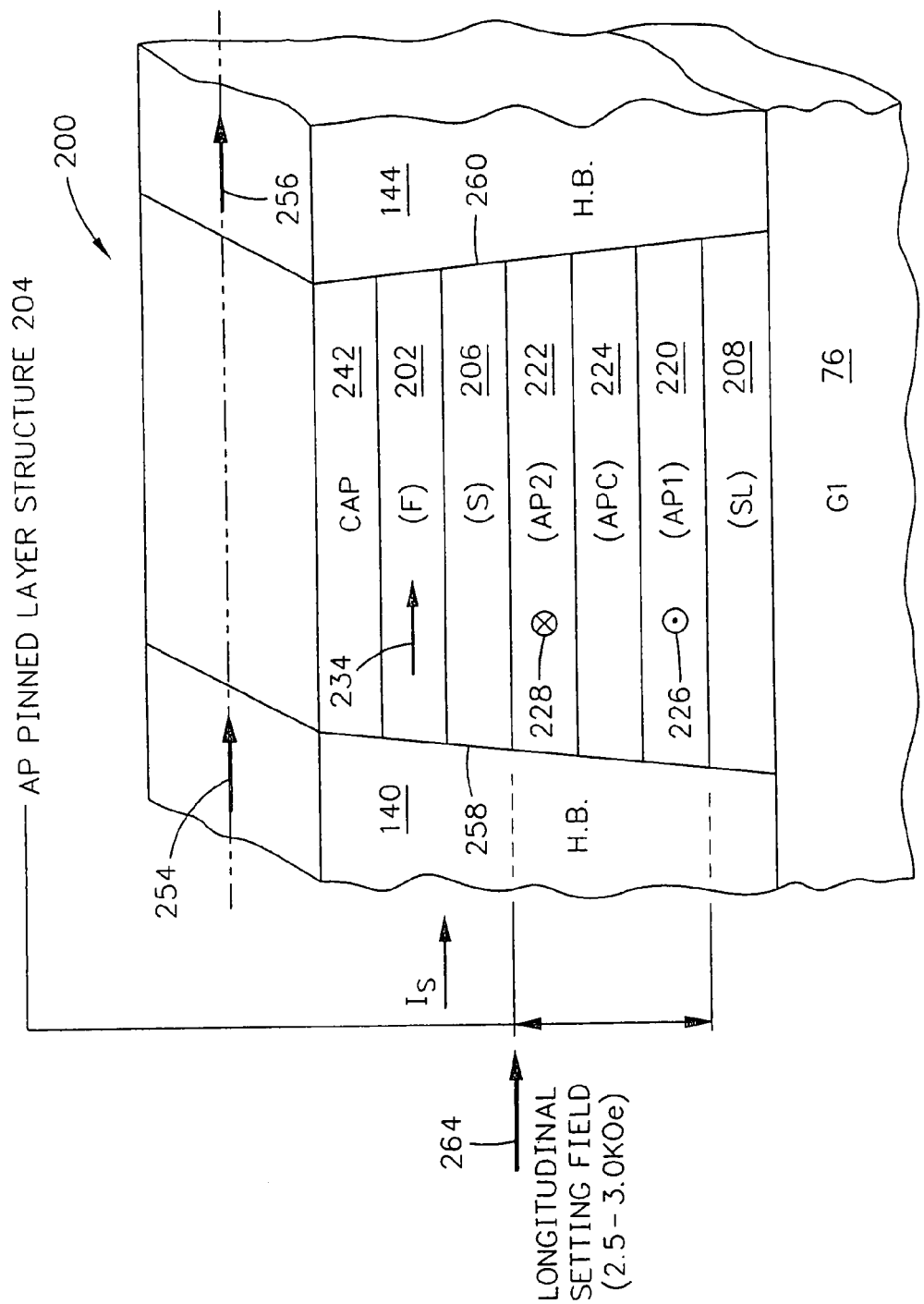
FIG. 10B is the same as FIG. 10A except the sensor is being longitudinally set.

It should be noted that the magnetic moments 254 and 256 of the first and second hard bias layers are oriented parallel to the magnetic field 262 after application of the magnetic field 262. Accordingly, magnetic moments 254 and 256 are oriented 30° to the ABS which means that only the components of the magnetic fields 254 and 256, which are parallel to the ABS, longitudinally stabilize the free layer 202. This means that the hard bias layers 140 and 144 must be sufficiently thick so that there are sufficient horizontal components of the magnetic moments 254 and 256 to implement the desired stabilization. This problem has been overcome by applying a magnetic field 264, as shown in FIG. 10B, which is oriented parallel to the ABS and parallel to the major planes of the layers of the sensor. The strength of the field 264 is preferably 2.5 kOe to 3.0 kOe and is in any event less than the field 262 in FIG. 10A. After the application of the magnetic field 264 the magnetic moments 254 and 256 of the hard bias layers are oriented parallel to the ABS so that the magnetic moments 254 and 256 fully stabilize the free layer 202. With this scheme the thickness of the hard bias layers 140 and 144 in FIG. 10B can be less than the thicknesses of the hard bias layers 140 and 144 in FIG. 10A.

Another embodiment 300 of the present invention is illustrated in FIG. 11A which is the same as the embodiment 200 illustrated in FIG. 10 except the embodiment 300 employs a second spacer layer (S2) 302 which is located between the free layer structure 202 and a second AP pinned layer structure 304. In this embodiment the layer 206 is a first spacer layer (S1). The second AP pinned layer structure 304 has an antiparallel coupling (APC) 306 which is located between third and fourth antiparallel pinned layers (AP3) 308 and (AP4) 310. The third AP pinned layer 308 has a magnetic moment 312 which is directed perpendicular to and into the sensor and the fourth AP pinned layer 310 has a magnetic moment 314 which is antiparallel thereto. It is important that the magnetic moments 228 and 312 of the second and third AP pinned layers be oriented in the same direction so that when the magnetic moment 234 of the free layer structure is rotated the change in resistance of the sensor is additive on each side of the free layer structure instead of subtracting from one another. The sensor 300 in FIG. 11A is a dual self-pinned AP pinned layer structure which has a high signal output with a minimum stack height so as to decrease the gap length between the first and second shield layers thereby increasing the linear read bit density of the read head.

Again, the magnetic field 262 is applied at an acute angle to the ABS and parallel to the major planes of the layers of the spin valve sensor which results in the magnetic moments 228 and 312 being properly polarized perpendicular to the ABS and into the sensor and the magnetic moments 226 and 314 being antiparallel thereto. Accordingly, the preferential setting implemented by the magnetic moment 262 can properly set the polarities for the magnetic moments of the AP pinned layers in a dual spin valve sensor as well as in a single spin valve sensor. As in FIG. 10A, the magnetic moments 254 and 256 of the hard bias layers are oriented parallel to the application of the magnetic field 262 after the preferential setting. When the magnetic field 264 in FIG. 11D is applied parallel to the ABS the magnetic moments 254 and 256 of the hard bias layers are changed from their orientations in FIG. 11A to parallel to the ABS so that the full force of the magnetic moments 254 and 256 longitudinally stabilize the free layer 202.

Figure 12A:
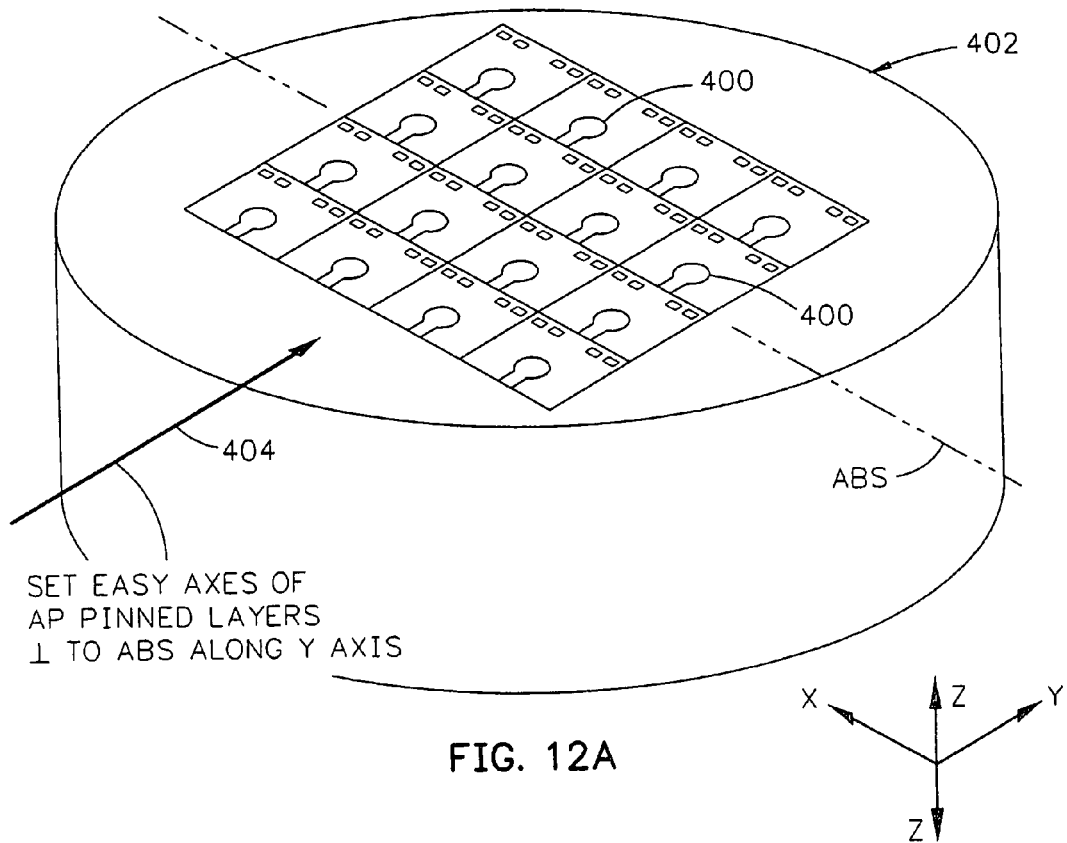
FIG. 12A is an isometric illustration of setting the easy axes of the magnetic moments of the AP pinned layers perpendicular to the ABS at the wafer level.

In FIG. 12A a plurality of magnetic head assemblies 400 are shown in rows and columns on a wafer 402. In a preferred embodiment the easy axes of the AP pinned layers are set perpendicular to the ABS in planes parallel to the major planes of the layers of the read head assemblies along the y axis by the application of a field 404 which is oriented perpendicular to the air bearing surfaces of the magnetic head assemblies and parallel to the major planes of the layers of the read head assemblies. In a preferred embodiment the AP pinned layers of the magnetic head assemblies are sputter deposited in the presence of the field 404 which results in the desired setting of the easy axes. The strength of this field may be from 50 Oe to 100 Oe.

Figure 12B:
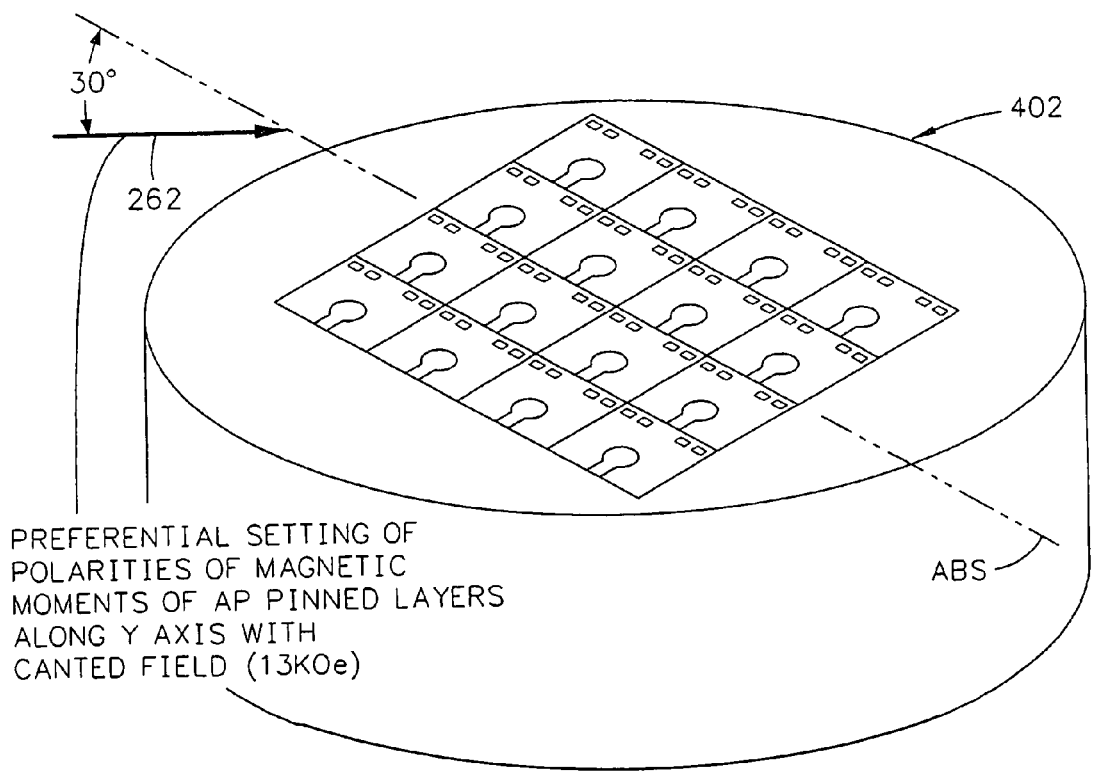
FIG. 12B is the same as FIG. 12A except a magnetic field is applied at the wafer level for preferentially setting the polarities of magnetic moments of the AP pinned layers.
Figure 12C:
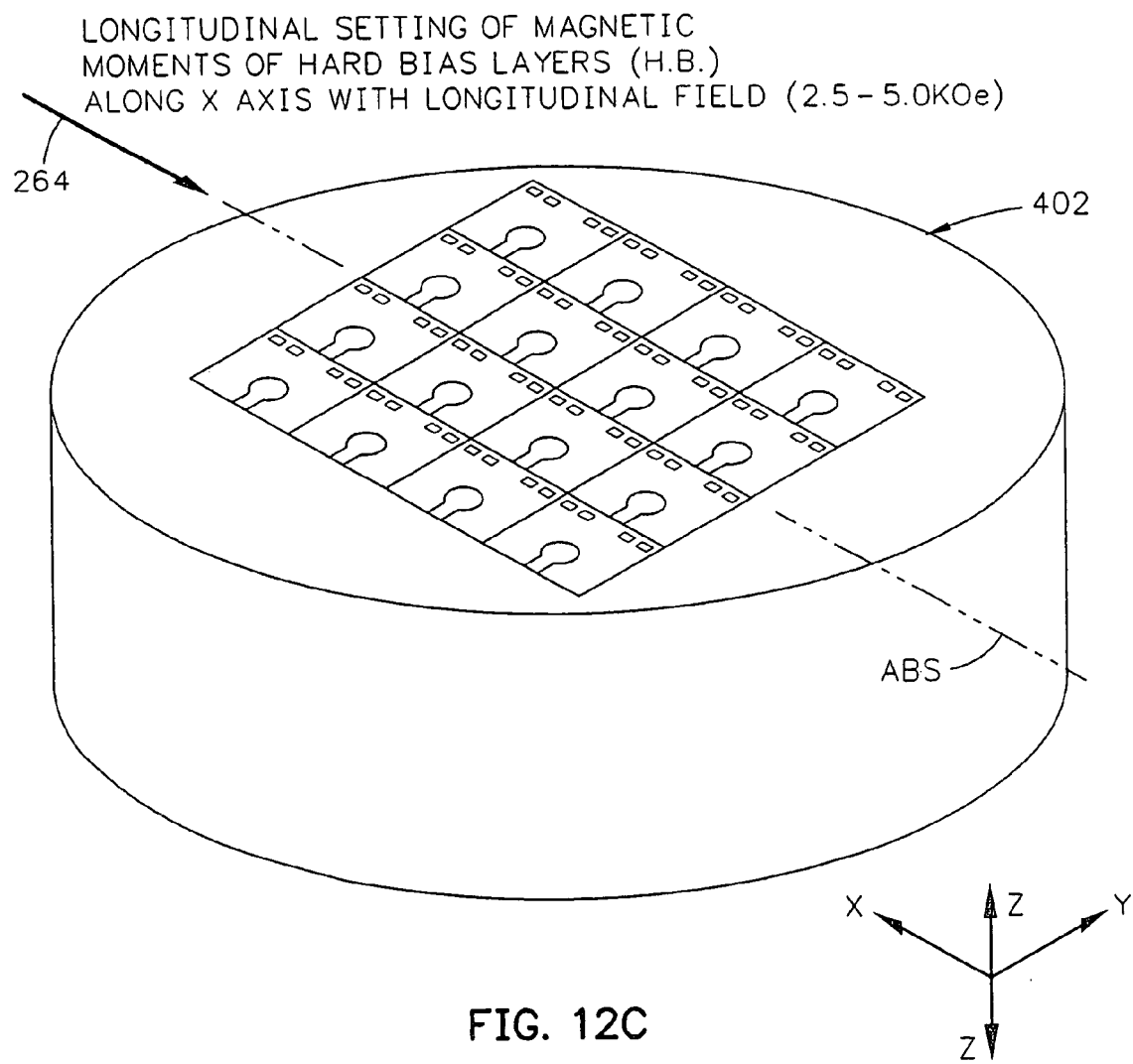
FIG. 12C is the same as FIG. 12B except a magnetic field is applied at the wafer level for longitudinally setting the magnetic moments of the hard bias layers of the read head assembly.

In FIG. 12B the canted field 262, which is described hereinabove, is applied for preferentially setting polarities of the magnetic moments of the AP pinned layers along the y axis. In FIG. 12C the magnetic field 264, which is described hereinabove, is applied which longitudinally sets the magnetic moments of the hard bias layers along the x axis.

Figure 13A:
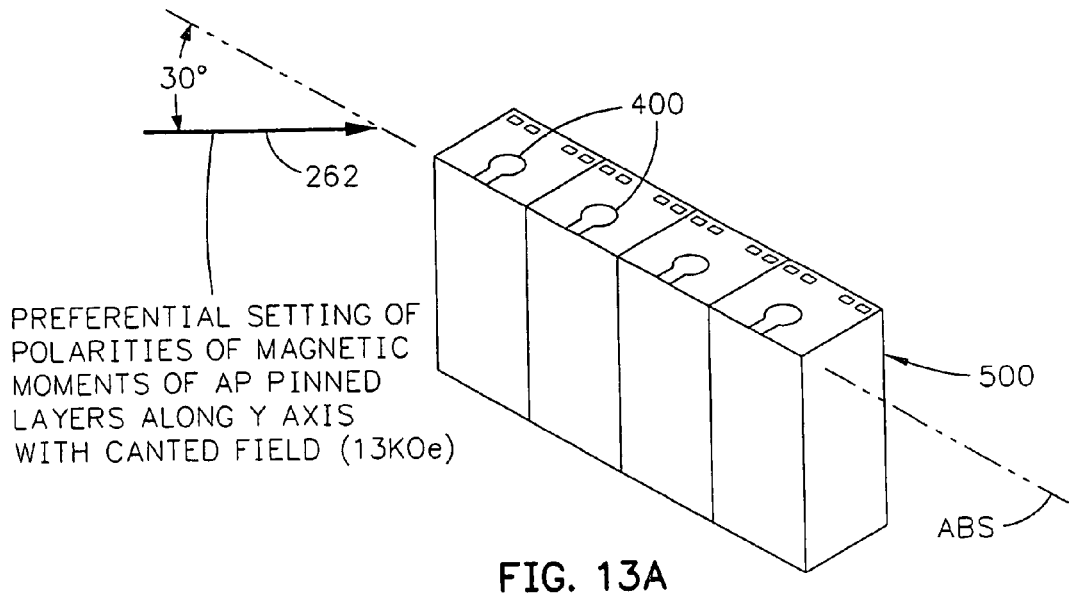
FIG. 13A is an isometric illustration of a row of magnetic head assemblies wherein a field is applied for preferentially setting the polarities of the magnetic moments of the AP pinned layers.
Figure 13B:
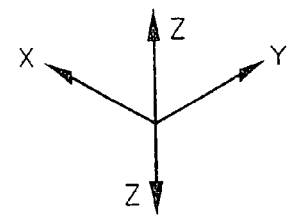
FIG. 13B is the same as FIG. 13A except a magnetic field is applied for longitudinally setting the magnetic moments of the hard bias layers.
Figure 13B:
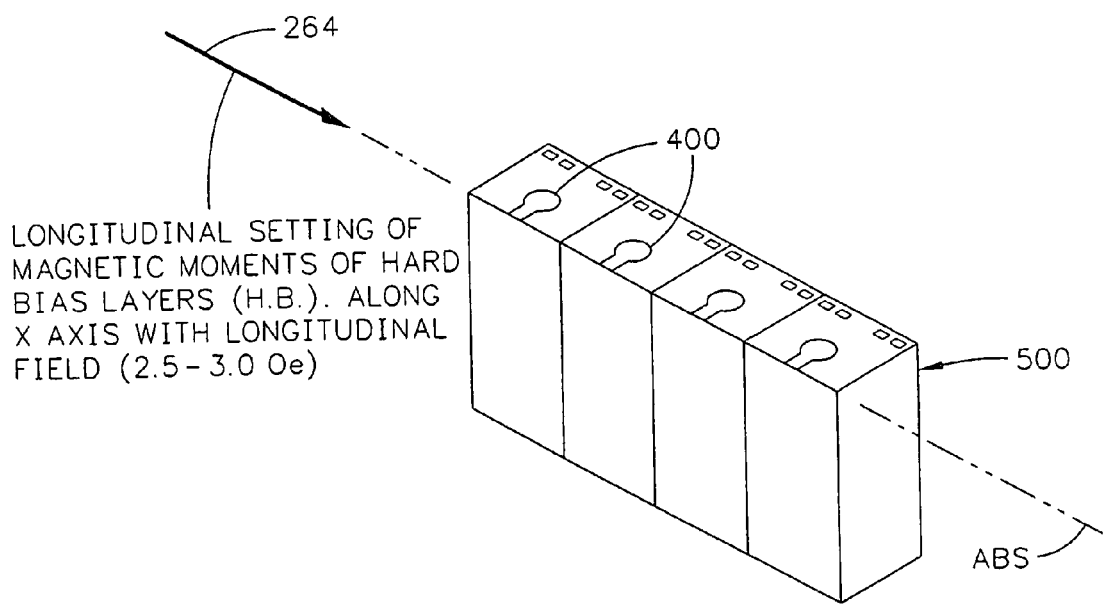

Optionally, as shown in FIG. 13A, the magnetic moment 262 may be applied at the row level where a plurality of the magnetic head assemblies 400 are arranged in a row 500 for preferentially setting the magnetic moments of the AP pinned layers along the y axis. As shown in FIG. 13B the magnetic field 264 may then be applied to the row 500 of magnetic head assemblies for longitudinally setting the magnetic moments of the hard bias layers along the y axis.

Figure 14A:
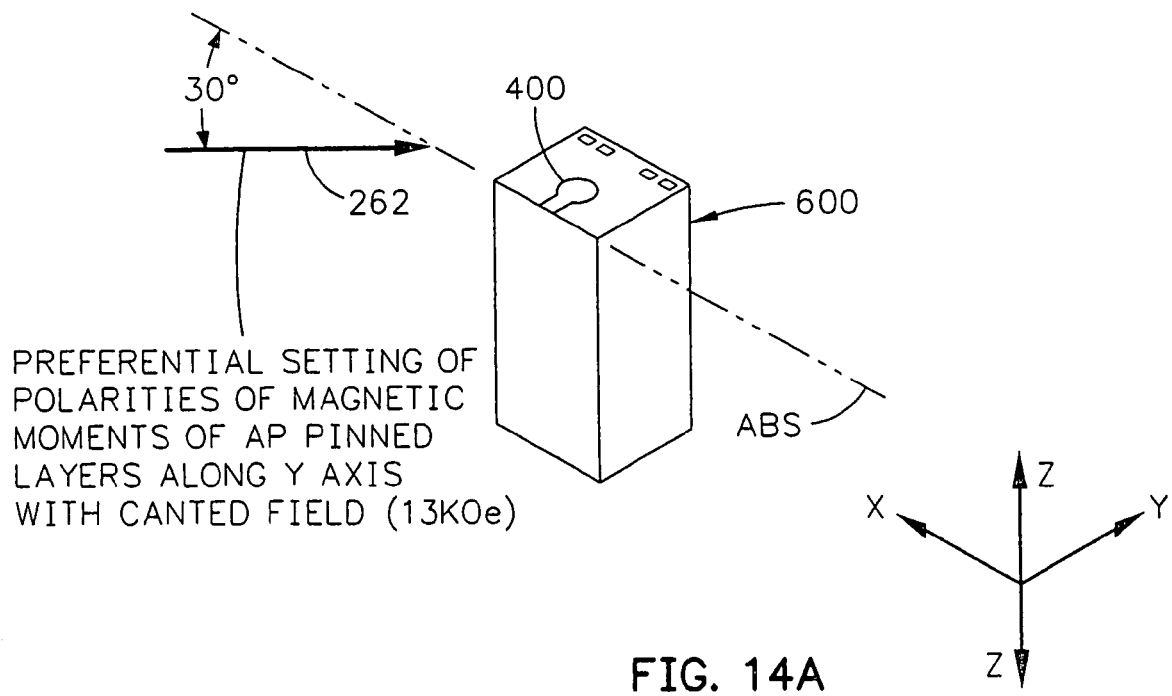
FIG. 14A is an isometric illustration of a slider which supports a magnetic head assembly wherein a magnetic field is applied for preferentially setting the polarities of the magnetic moments of the AP pinned layers of the magnetic head assembly.
Figure 14B:
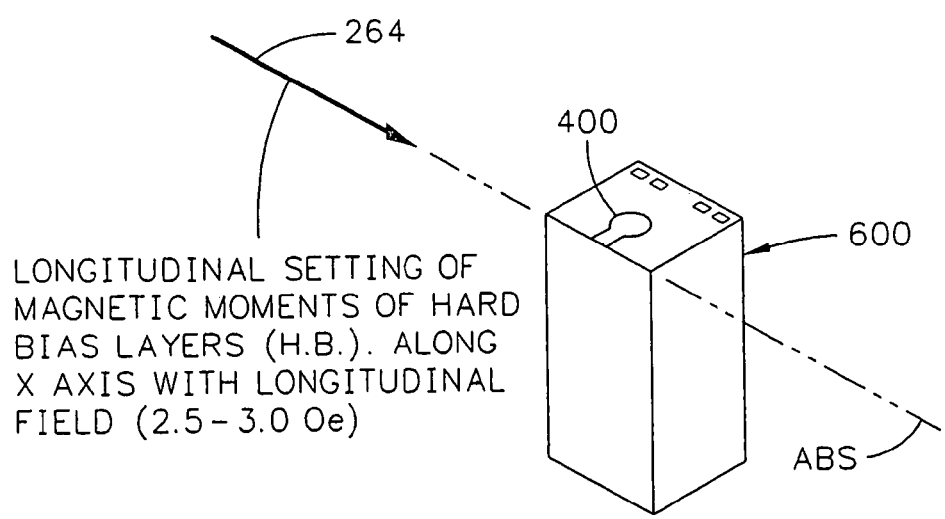
FIG. 14B is the same as FIG. 14A except a field is applied for longitudinally setting the magnetic moments of the hard bias layers.

Another option is shown in FIG. 14A wherein the magnetic field 262 may be applied to a single magnetic head assembly 400 mounted on the slider 600 for preferentially setting the polarities of the magnetic moments of the AP pinned layers of the magnetic head assembly 400 along the y axis. In FIG. 14B the magnetic moment 264 may then be applied to the magnetic head assembly 400 for setting the magnetic moments of the hard bias layers along the y axis.

A preferred scheme is setting the easy axes of the AP pinned layers perpendicular to the ABS, as shown in FIG. 12A, followed by applying the magnetic field 262 at the row level in FIG. 13A for preferentially setting the polarities of the magnetic moments of the AP pinned layers along the y axis, followed by applying the magnetic field 264 for longitudinally setting the magnetic moments of the hard bias layer at the row level, as shown in FIG. 13B.

A preferred aspect of the invention is the employment of materials for the first and second AP pinned layers AP1 and AP2 that result in a strongly self-pinned AP pinned layer structure wherein the sensor has an improved amplitude output and an acceptable magnetoresistive coefficient dr/R. Test results wherein $Co_{60}Fe_{40}$ is employed in various AP pinned layers are shown in Examples 1-5 in the following chart from the aforementioned co-pending application.

Examples 1-5 were tested at the coupon level and Examples 1 and 2 were further tested at the row level. At the coupon level a single sensor is fabricated on a glass substrate and is not lapped to the ABS. Since lapping causes the aforementioned ABS compressive stress the ABS compressive stress due to lapping is not present at the coupon level. The row level is a row of read heads including their read sensors and is taken from a slider substrate where rows and columns of such read heads have been fabricated. After dicing the row of read heads from the slider substrate, the row is lapped to the ABS which causes the aforementioned compressive stress.

At the coupon level the magnetoresistive coefficient dr/R, the intrinsic uniaxial anisotropy field $H_{Ki}$, the magnetostriction $\lambda$ (AP) of the AP pinned layers, the magnetostriction uniaxial anisotropy field $H_{K\lambda}$, the resistance of the sensor $R_S$ and the magnetostriction of the free layer $\lambda$ (FL) were determined and/or calculated. At the row level Examples 1 and 2 were tested for amplitude output.

In the prior art Example 1 AP1 was 13 Å of $Co_{90}Fe_{10}$ and AP2 was 20 Å of $Co_{90}Fe_{10}$. The dr/R was 9.16% and the $H_{K\lambda}$ of each AP pinned layer was 300 Oe. The amplitude output tested at the row level was 875 microvolts.

Two examples, which are embodiments of the present invention, are Examples 2 and 5. In Example 2 AP1 was 13 Å of $Co_{60}Fe_{40}$ and AP2 was 20 Å of $Co_{90}Fe_{10}$. The dr/R was satisfactory at 9.11 and the output tested at the row level was 1225 microvolts which is 40% greater than the output in Example 1. In Example 5 AP1 was 13 Å of $Co_{90}Fe_{10}$ and AP2 was a lamination of a second film of 5 Å $C6_{60}Fe_{40}$ between a first film of 5 Å $Co_{90}Fe_{10}$ and a third film of 10 Å $Co_{90}Fe_{10}$. The dr/R was satisfactory at 8.91%. Example 5, which was not tested, is a combination of Examples 2 and 5.

In Example 3 AP1 was 13 Å $Co_{90}Fe_{10}$ and AP2 was 20 Å $Co_{60}Fe_{40}$. It can be seen that the dr/R of 8.07% was a significant drop from the dr/R in Example 1. In Example 4 AP1 was 13 Å $Co_{60}Fe_{40}$ and AP2 was 20 Å $Co_{60}Fe_{40}$. Again, it can be seen that the dr/R of 8.01% is a significant drop from the dr/R in Example 1.

Accordingly, an aspect of the invention is that one of the AP pinned layers has a higher iron (Fe) content than the other of the AP pinned layers. The preferred embodiments are shown in Examples 2, 5 and 6. The discussion regarding the examples in the above chart also apply to the embodiment in FIG. 11A except AP3 and AP4 in FIG. 11A are to be considered as AP2 and AP1 in the chart.

Sensor Reset:

With reference to FIGS. 13A and 13B, after the wafer has been sliced into rows 500, the ABS is of the sliders is formed by a lapping process, which removes slider material until a desired sensor stripe height is reached. It has been found that even when sensors 300 initially had the correct polarity at the wafer level of manufacture, after slicing the wafer into rows and lapping to form the ABS the polarity of some of those sensors may flip to the incorrect polarity. It has also been found that this is not the result of permanent damage, but is merely the result of temporary mechanical strains to the sensor during manufacturing processes such as lapping.

| | | | $Co_{60}Fe_{40}$ Experiments | | | | |
|---|---|---|---|---|---|---|---|
| Example | Position Inserted | dR/R (%) | $H_{Ki}$ | $\lambda$(AP) | $H_{K\lambda}$ | $R_S$ (Ω/sq) | $\lambda$(FL) |
| 1 | Prior Art | 9.16 | 30 Oe | +1.5E−05 | 300 Oe | 23.0 | −7.64E−07 |
| 2 | AP1 | 9.11 | 30 Oe | +3.0E−5 | 500 Oe | 23.3 | −4.00E−7 |
| 3 | AP2 | 8.07 | 30 Oe | +3.0E−5 | 500 Oe | 21.6 | −7.29E−07 |
| 4 | AP1/AP2 | 8.01 | 30 Oe | +3.0E−5 | 500 Oe | 21.5 | −2.58E−07 |
| | | | 30 Oe | +3.0E−5 | 500 Oe | | |
| 5 | AP2* | 8.91 | 30 Oe | +1.9E−5 | 400 Oe | 23.4 | −4.07E−07 |
| 6 | AP1/AP2* | | | | | | |

*lamination

During the lapping operation, for instance, the sensors undergo mechanical strain so that the compressive stresses in the sensor momentarily disappear. Since the compressive stresses in the sensor in combination with the high positive magnetostriction of the pinned layers 220, 222 are necessary to maintain pinned layer pinning, the temporary removal of such stresses allows the pinned layer magnetizations to flip.

This flipping during manufacture is not limited to self pinned sensors, but is also seen in AFM pinned sensor (ie. pinned layers that are pinned by exchange coupling with a layer of antiferromagnetic (AFM) material). It is believed that some of the sensors undergo a stress induced anisotropy that is greater than the exchange field anisotropy provided by the AFM layer. We have found this flipping in AFM pinned sensors is also not the result of permanent damage, and can be fixed by the reset procedure of the present invention.

With reference to FIGS. 13A and 13B, once the wafer has been sliced into rows and the ABS lapping procedure has been performed, the sensors are tested to determine whether any of the sensors have flipped. If one or more sensors have flipped their polarity, then the sensors undergo a reset procedure. The testing procedures and tooling with be familiar to those skilled in the art and involves electrically connecting a testing tool to contact pads on the slider.

Figure 15:
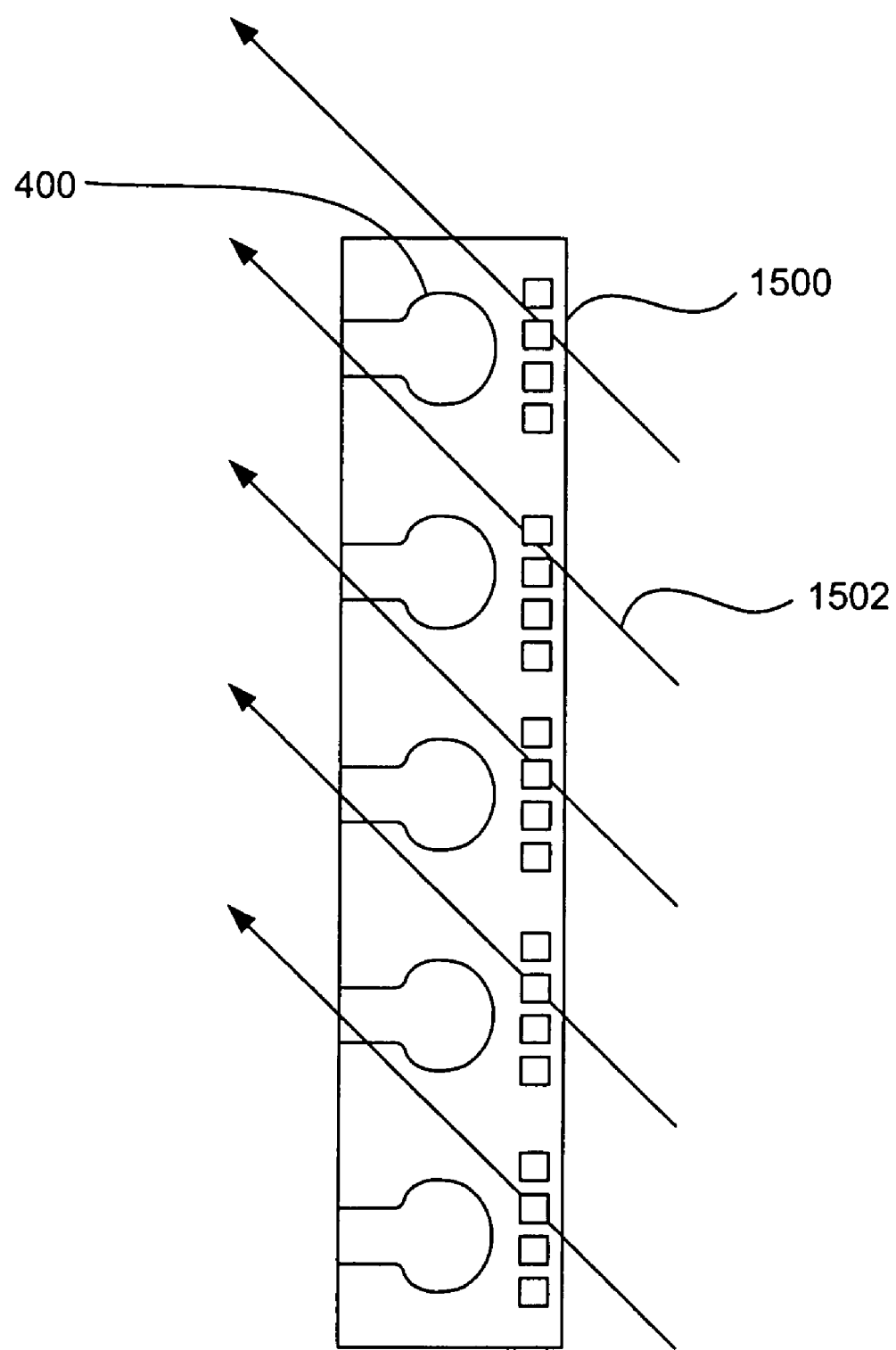
FIG. 15 is a view of a row of sliders undergoing a pinned layer polarity reset procedure in a magnetic field.

With reference to FIG. 15, the row 1500 of sliders is placed into a fixture, not shown and placed in a magnetic field 1502. The magnetic field is directed at about between 35 and 55 degrees with respect to the air bearing plane, and more preferably about 45 degrees relative to the air bearing plane. The magnetic field is relatively strong, being from 40 to 60 KOe and more preferably about 50 KOe. This procedure can be performed at room temperature. No heat needs to be applied to the sensor.

As discussed above, the magnetic layers making up the pinned layer structure can be constructed of materials that are different from one another, which will result in each of the magnetic layers having different magnetic anisotropies. For example if the magnetic layers 220, 222 (FIG. 10A) are both constructed of CoFe, but one of the layers has a higher percentage of Fe than the other, the layer having the higher percentage of Fe will also have a higher magnetic anisotropy due to its higher positive magnetostriction. When the magnetic field 1502 is applied, the moments of both layers 220, 222 will be directed in the direction of the magnetic field. However, as the magnetic field decreases, the layer having the higher magnetic anisotropy will align in the direction of the longitudinal component of the magnetic field. This magnetic layer could be considered the "master". The other layer, that having the lower magnetic anisotropy, will want to align antiparallel with the master and will flip to the direction opposite the master and opposite the longitudinal component of the magnetic field. This layer having the lower magnetic anisotropy can be termed the "slave" since its direction is determined by the direction of the master layer. It should be appreciated that since this resetting method relies on the different magnetic anisotropies of the magnetic layers 220, 222, it will perform perfectly well on a pinned layer structure wherein the layers 220, 222 have exactly equal magnetic thicknesses and equal magnetic moments.

After the pinned layers have been reset, the row of sliders 1500 can be placed into a lower strength magnetic field (not shown), directed parallel to the ABS as desired to reset the hard bias layers for biasing the free layer. We have found that we can achieve a yield improvement of 5 to 10 percent by using the above described reset procedure.

DISCUSSION

Figure 11B:
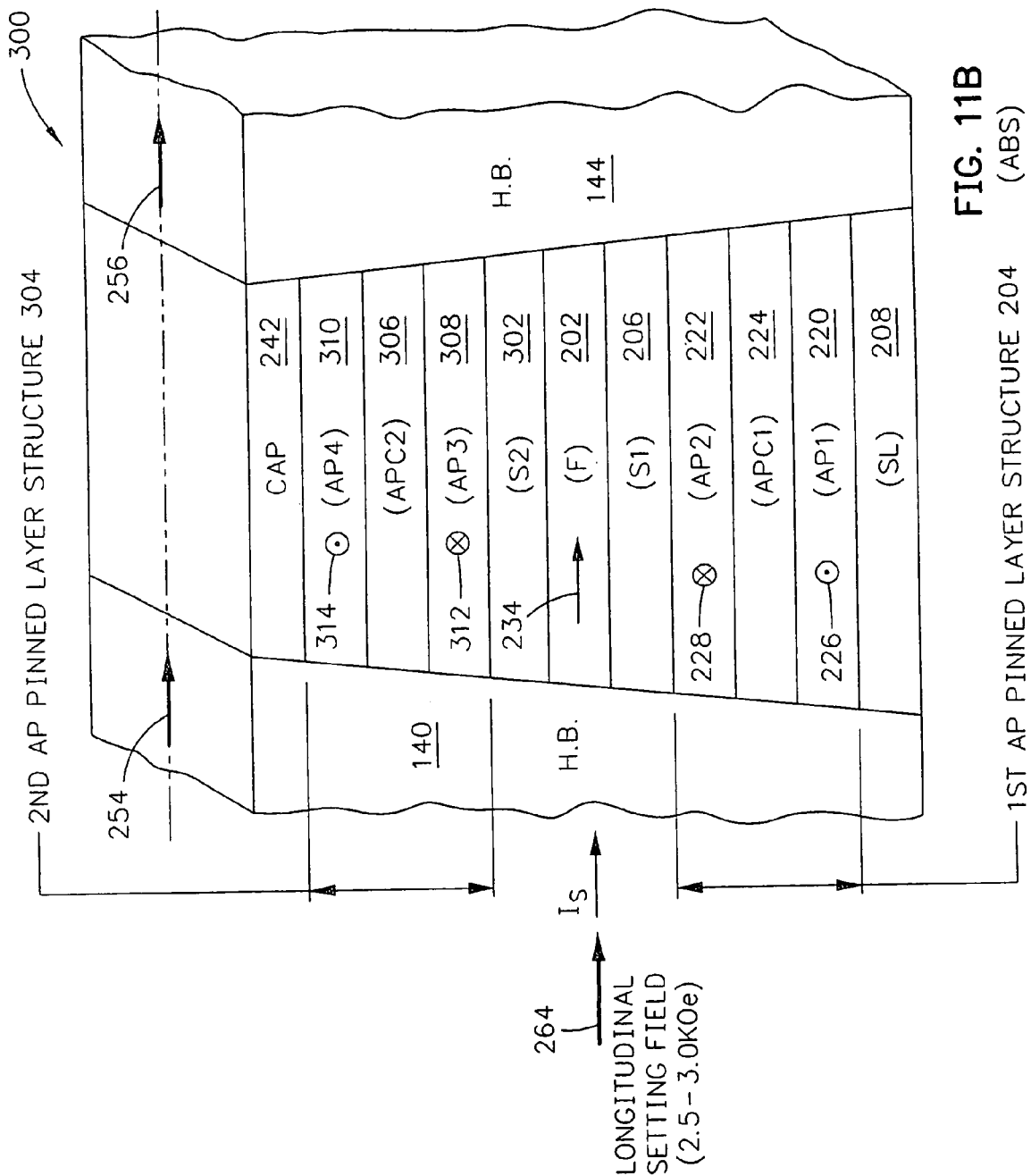
FIG. 11B is the same as FIG. 11A except the sensor is being longitudinally set.

It should be understood that the invention may be practiced with either a bottom spin valve, as illustrated in FIG. 10A or 10B, a top spin valve which is discussed but not shown, or with a dual AP pinned spin valve, as shown in FIG. 11A or 11B. It should be further understood that the preferential setting may be practiced without either the setting of the easy axes or the longitudinal setting. The strength of the field for the preferential setting may be on the order of 2.5 kg. It has been found that by removing the pinning layer for pinning a magnetic moment of the AP pinned layer that the amplitude read output of the read head can be increased 30% to 40%.

The spin valve sensor described herein is a current in plane (CIP) spin valve sensor since the sense current $I_S$ is conducted parallel to the major thin film planes of the sensor as shown in FIGS. 11-15. The inventive concepts described herein also apply to a current perpendicular to the planes (CPP) spin valve sensor where the sense current $I_S$ is conducted perpendicular to the major thin film planes of the sensor. Further, the inventive concepts are applicable to magnetoresistive sensors other than spin valve sensors such as a tunnel junction sensor where a tunneling current is conducted through the sensor in a direction perpendicular to the major thin film planes of the sensor. Still further, the slider supporting the magnetoresistive sensor may have a head surface other than the aforementioned ABS such as a tape surface for use in a tape drive. All embodiments can be employed in the structures shown in FIGS. 1-9.

The following commonly assigned U.S. Patents are incorporated in their entirety by reference herein: (1) U.S. Pat. No. 5,465,185; (2) U.S. Pat. No. 5,583,725; (3) U.S. Pat. No. 5,768,069; (4) U.S. Pat. No. 6,040,961; (5) U.S. Pat. No. 6,117,569; (6) U.S. Pat. No. 6,127,053; and (7) U.S. Pat. No. 6,219,211 B1.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A method for resetting pinned layer magnetization in a magnetoresistive sensor having an air bearing surface (ABS), the method comprising:
    forming a plurality of sensors onto a wafer;
    slicing the wafer into rows;
    lapping a surface of the rows to form the ABS;
    applying a magnetic field to the sensor, and wherein:
        the magnetic field is directed at angle of between 35 and 55 degrees with respect to the ABS;
        the magnetic field has a strength of from 40 to 60 KOe; and
        the magnetic field is applied after the lapping procedure.

2. A method for resetting pinned layer magnetization in a magnetoresistive sensor having an air bearing surface, the method comprising:
    applying a magnetic field to the sensor, and wherein:
        the magnetic field is directed at angle of between 35 and 55 degrees with respect to the ABS; and
        the magnetic field has a strength of from 40 to 60 KOe; and before applying the magnetic field, testing the sensor to determine whether pinned layer flipping has occurred and only applying
the magnetic field if flipping has occurred.

3. A method of constructing a sensor, comprising:
forming a magnetic pinned layer structure the layer having a surface defining a plane;
forming a spacer layer;
forming a magnetic free layer structure;
lapping in a plane perpendicular to the plane of the pinned layer surface to define an air bearing surface; and
applying a high strength magnetic field to the pinned layer structure the magnetic field being applied in a plane generally parallel with the plane defined by the surface of the pinned layer structure and canted with respect to the ABS surface.

4. A method as in claim 3, wherein the magnetic field is applied in a plane that is 35 to 50 degrees with respect to the ABS.

5. A method as in claim 3, wherein the magnetic field is applied in a plane that is about 45 degrees with respect to the ABS.

6. A method as in claim 3, wherein the magnetic field has a strength of 40 KOe to 50 KOe.

7. A method as in claim 3, wherein the forming the pinned layer structure comprises:
depositing a first magnetic layer;
depositing a non-magnetic electrically conductive coupling layer; and
depositing a second magnetic layer.

8. A method as in claim 3, wherein the forming the pinned layer comprises:
depositing a layer of antiferromagnetic material;
depositing a first magnetic layer;
depositing a non-magnetic electrically conductive coupling layer; and
depositing a second magnetic layer.

9. A method for constructing a plurality of magnetoresistive sensors, comprising:
forming a plurality of magnetoresistive sensors on a wafer, each sensor including a magnetic pinned layer structure, a magnetic free layer structure and a spacer layer sandwiched between the pinned layer structure and the free layer structure, the pinned layer structure, free layer structure and spacer layer being formed in parallel planes;
slicing the wafer into one or more rows each row containing a plurality of sensors;
performing a lapping procedure the row to define an air bearing surface in a plane perpendicular to the parallel planes of the pinned layer structure, free layer and spacer layer; and
applying a magnetic field to the row of sensors the magnetic field being directed at parallel to the plane of the pinned layer structure, the free layer and the spacer layer, and being directed at an angle of 35 to 55 degrees with respect to the plane of the ABS surface.

10. A method as in claim 9, wherein the magnetic field is applied at an angle of about 45 degrees with respect to the ABS.

11. A method as in claim 9, wherein the magnetic field has a strength of 40 to 60 KOe.

12. A method as in claim 9, wherein the magnetic field has a strength of about 50 KOe.

13. A method as in claim 9, wherein the forming the pinned layer structure includes:
forming a first magnetic layer;
forming an non-magnetic, electrically conductive spacer layer over the first magnetic layer; and
forming a second magnetic layer over the non-magnetic, electrically conductive spacer layer.

* * * * *